US006027153A

United States Patent [19]
Marshall

[11] Patent Number: 6,027,153
[45] Date of Patent: Feb. 22, 2000

[54] TROWEL

[76] Inventor: Jeffrey J. Marshall, P.O. Box 45, Chittenden, Vt. 05737

[21] Appl. No.: 09/012,544

[22] Filed: Jan. 23, 1998

[51] Int. Cl.$^7$ ........................................................ A01B 1/02
[52] U.S. Cl. ................................................ 294/55; 294/57
[58] Field of Search .................................. 294/55, 49, 57, 294/7; D8/10; 172/371, 378, 381; 74/551.9; 16/110 R, 111 R, 116 R, DIG. 12, 110.1

[56] References Cited

U.S. PATENT DOCUMENTS

| | | | |
|---|---|---|---|
| 57,759 | 9/1866 | Pfeifer | 294/55 |
| 151,238 | 5/1874 | Metcalfe et al. | 294/55 |
| D. 153,355 | 4/1949 | Hippman | D8/10 |
| D. 256,979 | 9/1980 | Nadle | D8/10 |
| D. 292,061 | 9/1987 | Germain | D8/10 |
| D. 292,865 | 11/1987 | Scott | D8/10 |
| D. 294,555 | 3/1988 | Tremaine | D8/10 |
| D. 303,484 | 9/1989 | Stanart | D8/10 |
| D. 305,496 | 1/1990 | Jasperson | D8/10 |
| D. 307,207 | 4/1990 | Wolf | D32/46 |
| D. 309,243 | 7/1990 | Yonkers | D8/10 |
| D. 318,602 | 7/1991 | Vosbikian | D8/10 |
| D. 338,378 | 8/1993 | Concari | D8/10 |
| D. 342,426 | 12/1993 | Concari | D8/10 |
| 356,344 | 1/1887 | Bardell | 294/55 |
| D. 359,892 | 7/1995 | Isbell, Sr. | D8/10 |
| D. 387,649 | 12/1997 | Concari et al. | D8/10 |
| 2,162,117 | 6/1939 | Perry | 81/489 |
| 4,950,013 | 8/1990 | Yonkers | 294/55 |
| 5,675,867 | 10/1997 | Howie, Jr. | 16/111 R |
| 5,816,337 | 10/1998 | Kun-Chuan | 172/381 |

OTHER PUBLICATIONS

*Trump Garden Tools* advertisement, published Apr. 5, 1965.

*Primary Examiner*—Dean J. Kramer
*Assistant Examiner*—Paul Chin
*Attorney, Agent, or Firm*—Richard C. Litman

[57] ABSTRACT

A garden trowel includes a handle, a blade, and a connection member interconnecting the handle and the blade. The handle has a length which accommodates the use of two hands. The blade includes a body portion and a stem portion. The body portion of the blade has a beveled edge. The stem portion of the blade is bent and is attached to the connection member. The bent stem portion of the blade effectively offsets the blade from the handle. The handle of the trowel is formed in an offset manner along a longitudinal axis. More particularly, the handle is rotationally offset in a range between about four and about six degrees with respect to a vertical plane intersecting the longitudinal axis (to the right for a right handed trowel and to the left for a left handed trowel). The handle includes an increasing, graduated size of the handle that extends from a forward end of the handle to a rear end of the handle. The forward end of the handle is connected to the blade via the connection member. The rear end of the handle includes first and second tapering, flattened sides which greatly increases the grip and turning power of the blade of the trowel much facilitating any kind of digging encountered.

19 Claims, 2 Drawing Sheets

6,027,153

TROWEL

BACKGROUND OF THE INVENTION

1. Field of the Invention

The present invention relates to garden tools, and more particularly, to a garden trowel.

2. Description of Related Art

Conventional garden trowels are designed for use with one hand only. Some have a dangerously small area near the sharp back shoulders of the metal blade of the trowel for the second hand. Many injuries have resulted in such inappropriate design and use conception. These one handed trowels are all of short length and poorly constructed so they last a relatively short time compared to their cost, even under ordinary digging conditions. Even with the recent development of one piece construction to reduce bending and breaking of the tool, the digging efficiency and safety functions of the trowel have not improved. Therefore, it is desirable for improvements in the trowel art.

The related art is represented by the following patents of interest.

U.S. Design Pat. No. 153,355, issued on Apr. 12, 1949 to Albert J. Hippman, shows an ornamental design for a transplanting trowel. Hippman does not suggest the trowel according to the claimed invention.

U.S. Design Pat. No. 256,979, issued on Sep. 23, 1990 to Edward A. Nadle, shows an ornamental design for a garden trowel. Nadle does not suggest the trowel according to the claimed invention.

U.S. Design Pat. No. 292,061, issued on Sep. 29, 1987 to Robert A. Germain, shows an ornamental design for a head of a shovel. Germain does not suggest the trowel according to the claimed invention.

U.S. Design Pat. No. 292,865, issued on Nov. 24, 1987 to Gary M. Scott, shows an ornamental design for a garden trowel. Scott does not suggest the trowel according to the claimed invention.

U.S. Design Pat. No. 294,555, issued on Mar. 8, 1988 to David K. Tremaine, shows an ornamental design for a hand trowel. Tremaine does not suggest the trowel according to the claimed invention.

U.S. Design Pat. No. 303,484, issued on Sep. 19, 1989 to William H. Stanart, shows an ornamental design for a digging tool. Stanart does not suggest the trowel according to the claimed invention.

U.S. Design Pat. No. 305,496, issued on Jan. 16, 1990 to Stephen Jasperson, shows an ornamental design for a garden trowel. Jasperson does not suggest the trowel according to the claimed invention.

U.S. Design Pat. No. 307,207, issued on Apr. 10, 1990 to Kenneth T. Wolf, shows an ornamental design for a scraping tool. Wolf does not suggest the trowel according to the claimed invention.

U.S. Design Pat. No. 309,243, issued on Jul. 17, 1990 to E. Hubbard Yonkers, shows an ornamental design for a garden trowel. Yonkers does not suggest the trowel according to the claimed invention.

U.S. Design Pat. No. 318,602, issued on Jul. 30, 1991 to Manuel Vosbikian, shows an ornamental design for a handle grip for a hand tool. Vosbikian does not suggest the trowel according to the claimed invention.

U.S. Design Pat. No. 338,378, issued on Aug. 17, 1993 to Gabriel E. Concari, shows an ornamental design for a transplanter. Concari '378 does not suggest the trowel according to the claimed invention.

U.S. Design Pat. No. 342,426, issued on Dec. 21, 1993 to Gabriel E. Concari, shows an ornamental design for a trowel. Concari '426 does not suggest the trowel according to the claimed invention.

U.S. Pat. No. 2,162,117, issued on Jun. 13, 1939 to Harlan A. Perry, describes a scraper. Perry does not suggest the trowel according to the claimed invention.

A Trump Garden Tools advertisement published on Apr. 5, 1965 describes a variety of trowels. The Trump Garden Tools advertisement does not suggest the trowel according to the claimed invention.

None of the above inventions and patents, taken either singly or in combination, is seen to describe the instant invention as claimed.

SUNMARY OF THE INVENTION

The present invention is a garden trowel. However, such a trowel may alternatively be effectively utilized as a tool in forestry or military operations. The design and construction of the trowel includes a handle, a blade, and a connection member interconnecting the handle and the blade. The handle is long relative to the handle length of standard trowels and is easily formed from wooden material, such as hickory or ash wood, but other workable or formable materials such as plastic, metal, composite fibers, and the like, are within the scope of the present invention. The handle preferably has length within a range between about five inches and about seven inches to accommodate the use of two hands. The increased handle length over the handle length of standard trowels allows placement of the lower hand well above the back flared edges of the trowel blade, and the other hand around the top of the handle to allow one to use both hands with their power to pull and dig. The increased length of the handle also enables one to be at a better distance from the dirt and provides much improved leverage.

The blade includes a body portion and a stem portion for connecting the blade to the handle. The blade is preferably made from relatively rough and resilient metal, such as plowshare steel or the like. The body portion of the blade preferably has a length within a range between about five inches and about seven inches and includes a tip portion which preferably has a length within a range between about one inch and about two inches. The body portion of the blade has a beveled edge. The beveled edge allows the blade to more easily pass through soil even though the body portion should be substantially thick so that the blade is rigid. The tip portion of the blade also has an edge that is preferably beveled. The five to seven inch length for the body portion of the blade is also preferred to provide sufficient reach for cultivation with the tip portion in hard to reach places, and because not many weeds have roots longer than six inches, the tip portion is therefore effective for completely digging most weeds.

The stem portion of the blade is bent and is attached to a connection member which connects the blade and the handle. The bent stem portion of the blade effectively offsets the blade from the handle in a manner similar to the offset neck of a shovel. The space left open when the trowel is lying face up on the ground enables a user's hand to pick up the trowel much more easily than trowels that lie flat against the ground. The length of the trowel also lets a user find, locate and keep track of the trowel.

The handle of the trowel is formed in an offset manner along a longitudinal axis. More particularly, the handle is rotationally offset in a range between about four and about six degrees with respect to a vertical plane intersecting the longitudinal axis (to the right for a right handed trowel and to the left for a left handed trowel). This four to six degree handle offset is for the purpose of having the trowel blade remain level when held in front of a user by the user's hand, or while the user works with the trowel directly in front of the user. The rotational offset is designed to compensate for the natural offset of the user's hand when held at one's side or raised directly from there, up and forward to hold such a tool in front of the user.

The handle includes an increasing, graduated size of the handle that extends from a forward end of the handle to a rear end of the handle. The forward end of the handle is connected to the blade via the connection member. The rear end of the handle is the rear end of the trowel. The increasing, graduated size of the handle prevents a user's hand from sliding off the back end of the handle. This also increases the hands' grip on the handle. The rear end of the handle also includes first and second tapering, flattened sides which greatly increases the grip and turning power of the blade of the trowel much facilitating any kind of digging encountered. The first flattened side is perpendicular to the longitudinal axis along which the handle is formed and tapers towards the top of the handle. The second flattened side extends downwardly from the bottom of the first flattened side at an angle preferably in a range between about 48° and about 52° from a horizontal line extending from the bottom of the first flattened side. The second flattened side tapers towards the bottom of the handle. This is to accommodate the upper reaches of the palm and the first section of the middle finger of the top hand, followed by the second and third sections of the middle finger of the top hand down the underside of the handle. This comfortable ergometric fit of the top hand on the handle provides great improvement in downward force and lateral twisting and digging movements.

Accordingly, it is a principal object of the invention to provide a garden trowel with a handle having a length in a range between about five inches and about seven inches to accommodate the use of two hands, a blade, and a connection member interconnecting the handle and the blade.

It is another object of the invention to provide a garden trowel with a rotationally offset handle and an offset blade.

It is an object of the invention to provide improved elements and arrangements thereof in a trowel for the purposes described which is relatively inexpensive, dependable, durable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

As illustrated in FIGS. 1–4, the present invention is a trowel indicated generally at 10. The trowel 10 may effectively be utilized as a garden trowel or, alternatively, as a tool in forestry operations, military operations, etc. As detailed below, the design and construction of the trowel 10 includes a handle 12, a blade 16, and a connection member 14 interconnecting the handle 12 and the blade 16. The handle 12 is long relative to the handle length of standard trowels and is easily formed from wooden material, such as hickory or ash wood, but other workable or formable materials such as plastic, metal, composite fibers, and the like, are within the scope of the present invention. The handle 12 preferably has length in a range between about five inches and seven inches to accommodate the use of two hands. The increased handle length over the handle length of standard trowels allows placement of the lower hand well above the back flared edges of the blade 16, and the other hand around the top of the handle 12 to allow one to use both hands with their power to pull and dig. The increased length of the handle 12 also enables one to be at a better distance from the dirt and provides much improved leverage.

The blade 16 includes a body portion and a stem portion for attaching the blade 16 to the connection member 14. The blade 16 is preferably made from relatively rough and resilient metal, such as plowshare steel or the like. The body portion of the blade 16 preferably has a length in a range between about five inches and about seven inches long and includes a tip portion which preferably has a length in a range between about one inches and about two inches. The body portion of the blade 16 preferably has a beveled edge. A beveled edge allows the blade 16 to more easily pass through soil even though the body portion should be substantially thick so that the blade 16 is rigid. The tip portion of the blade 16 also preferably has a beveled edge. The five to seven inch length for the body portion of the blade 16 is also preferred to provide sufficient reach for cultivation with the tip portion in hard to reach places, and because not many weeds have roots longer than six inches, the tip portion is therefore effective for completely digging most weeds.

The stem portion of the blade 16 is bent and is attached to the connection member 14 which interconnects the blade 16 to the handle 12. The bent stem portion of the blade 16 effectively offsets the blade 16 from the handle 12 in a manner similar to the offset neck of a shovel. The space left open when the trowel 10 is lying face up on the ground enables a user's hand to pick up the trowel 10 much more easily than trowels that lie flat against the ground. The total length increase of the trowel 10 also lets a user find, locate and keep track of the trowel 10.

Figure 1:
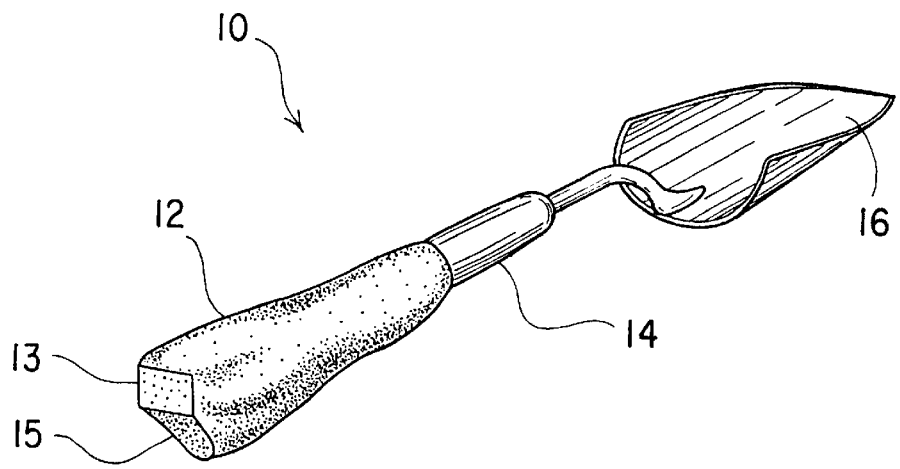
FIG. 1 is rear perspective view of a trowel according to the invention.
Figure 2:
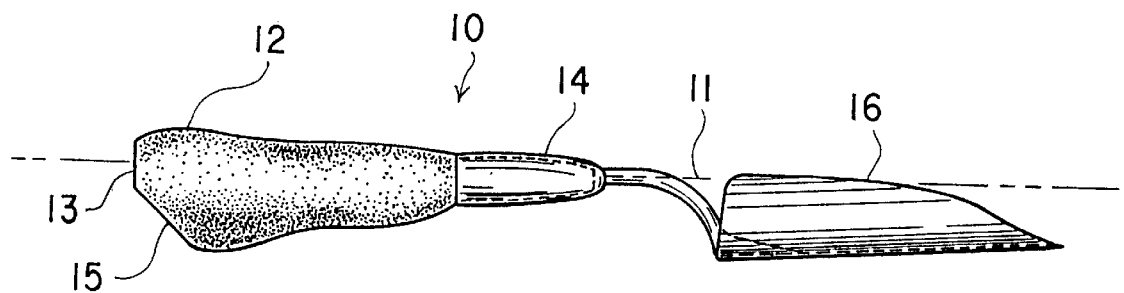
FIG. 2 is side view of a trowel according to the invention.
Figure 3:
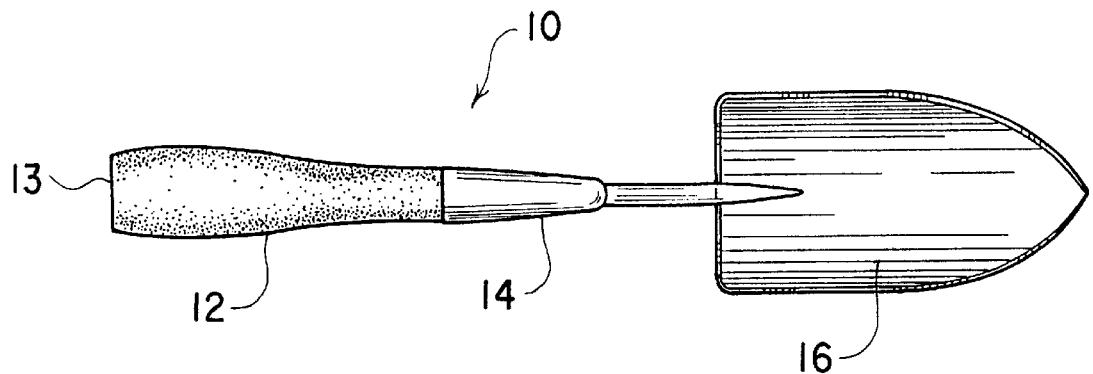
FIG. 3 is top view of a trowel according to the invention.

Referring to FIGS. 2 and 3, the handle 12 includes an increasing, graduated size of the handle 12 that extends from a forward end of the handle 12 to a rear end of the handle 12. The forward end of the handle 12 is connected to the blade 16 via connection member 14. The rear end of the handle 12 is the rear end of the trowel 10. The increasing, graduated size of the handle 12 prevents a user's hand from sliding off the back end of the handle 12. This also increases the hands' grip on the handle 12. The rear end of the handle 12 includes first and second tapering, flattened sides 13, 15 which greatly increases the grip and turning power of the blade 16 of the trowel 10 much facilitating any kind of digging encountered. The first flattened side 13 is perpendicular to the longitudinal axis 11 along which the handle 12 is formed and tapers towards the top of the handle 12. The second flattened side 15 extends downwardly from the bottom of the first flattened side 13 at an angle preferably in a range between about 48° and about 52° from a horizontal line extending from the bottom of the first flattened side 13. The second flattened side 15 tapers towards the bottom of the handle 12. This is to accomodate the upper reaches of the palm and the first section of the middle finger of the top hand, followed by the second and third sections of the middle finger of the top hand down the underside of the handle. This comfortable ergometric fit of the top hand on the handle provides great improvement in downward force and lateral twisting and digging movements.

The 48° to 52° angle of the second flattened side of the handle 12 enables the placement of the "pinkie" finger there to aid in comfortably gripping the handle 12 when using the trowel 10 with one hand. It is also a broad, smooth surface to come in contact with the palm of a second hand when digging with two hands. The locked-in "pinkie" also provides added thrust forward to the power of the hand.

Figure 4:
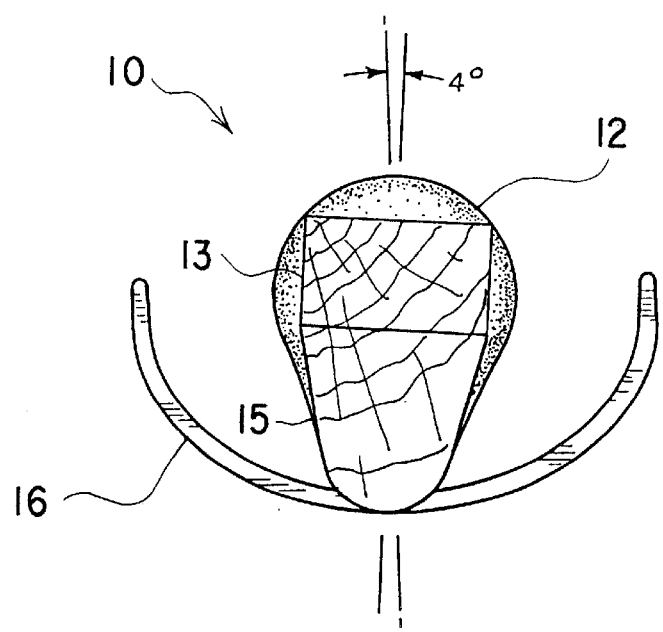
FIG. 4 is rear view of a trowel according to the invention.

As shown in FIG. 4, the handle 12 of the trowel 10 is formed in an offset manner along a longitudinal axis. More particularly, the handle 12 is rotationally offset in a range between about four and about six degrees with respect to a vertical plane intersecting the longitudinal axis (to the right for a right handed trowel and to the left for a left handed trowel). This four to six degree handle offset is for the purpose of having the trowel blade 16 remain level when held in front of a user by the user's hand, or while the user works with the trowel 10 directly in front of the user. The rotational offset is designed to compensate for the natural offset of the user's hand when held at one's side or raised directly from there, up and forward to hold such a tool in front of the user.

In summary, a garden trowel has been provided having an unusually long handle which enables the trowel to be easily thrust into the earth and easily rotated for loosening of the earth with a twisting motion, with the trowel importantly being provided with an offset handle. This trowel is meant to fill the void existing between low efficiency ordinary trowels and the shovel.

This tool has a nationwide use and also a worldwide use in gardering, construction, nursery, farming, forestry and perhaps even military work.

It is to be understood that the present invention is no limited to the sole embodiment described above, but encompasses any and all embodiments within the scope of the following claims.

I claim:

1. A trowel comprising:
   a blade assembly having a body portion suitable for digging and a stem portion;
   a handle assembly formed along a longitudinal axis, wherein said handle assembly includes an increasing, graduated size of said handle assembly that extends from a forward portion of said handle assembly to a rear portion of said handle assembly, wherein said handle assembly has a length which accommodates the use of two hands, and wherein a vertical plane of said handle assembly is rotationally offset in a range between about four and about six decrees with respect to a vertical plane intersecting the longitudinal axis; and
   a connection member for connecting said stem portion of said blade assembly and said forward portion of said handle assembly.

2. The trowel according to claim 1, wherein said body portion is beveled for digging and said stem portion is bent for connecting said blade assembly to said connection member in an offset manner.

3. The trowel according to claim 1, wherein said body portion has a length within a range between about five inches and about seven inches.

4. The trowel according to claim 1, wherein said handle assembly has a length within a range between about five inches and about seven inches.

5. The trowel according to claim 1, wherein said handle assembly includes first and second tapering, flattened side portions on said rear portion which greatly increases grip and turning power of said blade assembly.

6. The trowel according to claim 5, wherein said first flattened side portion is perpendicular to the longitudinal axis along which said handle assembly is formed and tapers towards a top of said handle assembly.

7. The trowel according to claim 5, wherein said second flattened side portion extends in a tapering manner downwardly from a bottom of said first flattened side portion at an angle within a range between about 48° and about 52° from a horizontal line extending from the bottom of said first flattened side portion.

8. The trowel according to claim 1, wherein said handle assembly is made from material within the group comprising plastic, metal, and composite fibers.

9. The trowel according to claim 1, wherein said handle assembly is made from wood.

10. The trowel according to claim 9, wherein said wood is hickory wood.

11. The trowel according to claim 9, wherein said wood is ash wood.

12. A trowel comprising:
    a blade assembly having a beveled body portion suitable for digging with a length in a range between about five inches and about seven inches, said blade assembly having a bent stem portion;
    a handle assembly formed along a longitudinal axis, wherein said handle assembly includes an increasing, graduated size of said handle assembly that extends from a forward portion of said handle assembly to a rear portion of said handle assembly that includes first and second tapering, flattened side portions on said rear portion which greatly increases grip and turning power of said blade assembly, and wherein said handle assembly has a length in a range between about five inches and about seven inches that accommodates the use of two hands; and
    a connection member for connecting said stem portion of said blade assembly and said forward portion of said handle assembly.

13. The trowel according to claim 12, wherein vertical plane of said handle assembly is rotationally an offset in a range between about four and about six degrees with respect to a vertical plane intersecting the longitudinal axis.

14. The trowel according to claim 12, wherein said first flattened side portion is perpendicular to the longitudinal axis along which said handle assembly is formed and tapers towards a top of said handle assembly.

15. The trowel according to claim 12, wherein said second flattened side portion extends portion in a tapering manner downwardly from a bottom of said first flattened side portion at an angle in a range between about 48° and about 52° from a horizontal line extending from the bottom of said first flattened side portion.

16. The trowel according to claim 12, wherein said handle assembly is made from material within the group comprising plastic, metal, and composite fibers.

17. The trowel according to claim 12, wherein said handle assembly is made from wood.

18. The trowel according to claim 17, wherein said wood is hickory wood.

19. The trowel according to claim 17, wherein said wood is ash wood.

* * * * *